July 26, 1966  G. SCHLICHT ET AL  3,262,857
UNDERGROUND MINING REACTOR APPARATUS
Filed March 27, 1963  6 Sheets-Sheet 2

Inventors
GÜNTHER SCHLICHT, deceased,
by Erika Schlicht, administratrix
HANS LANGE
By Krafft & Wells
Attorneys

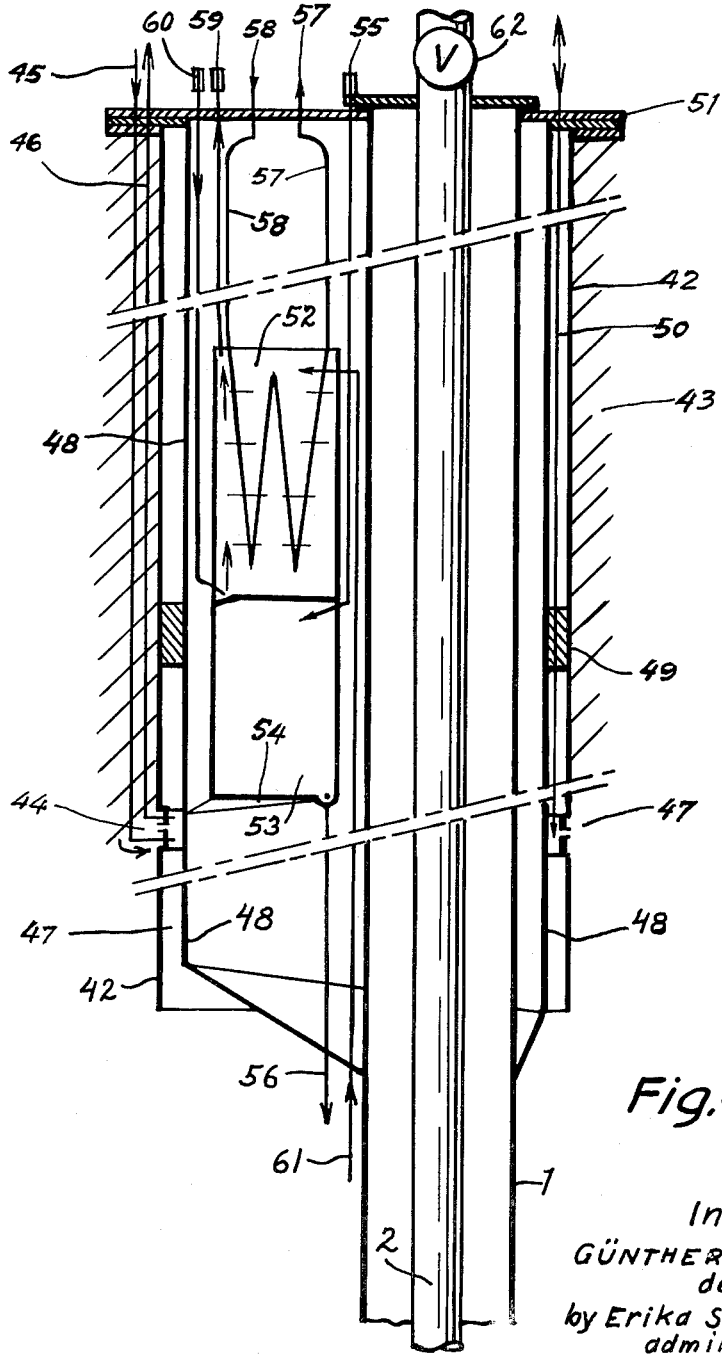

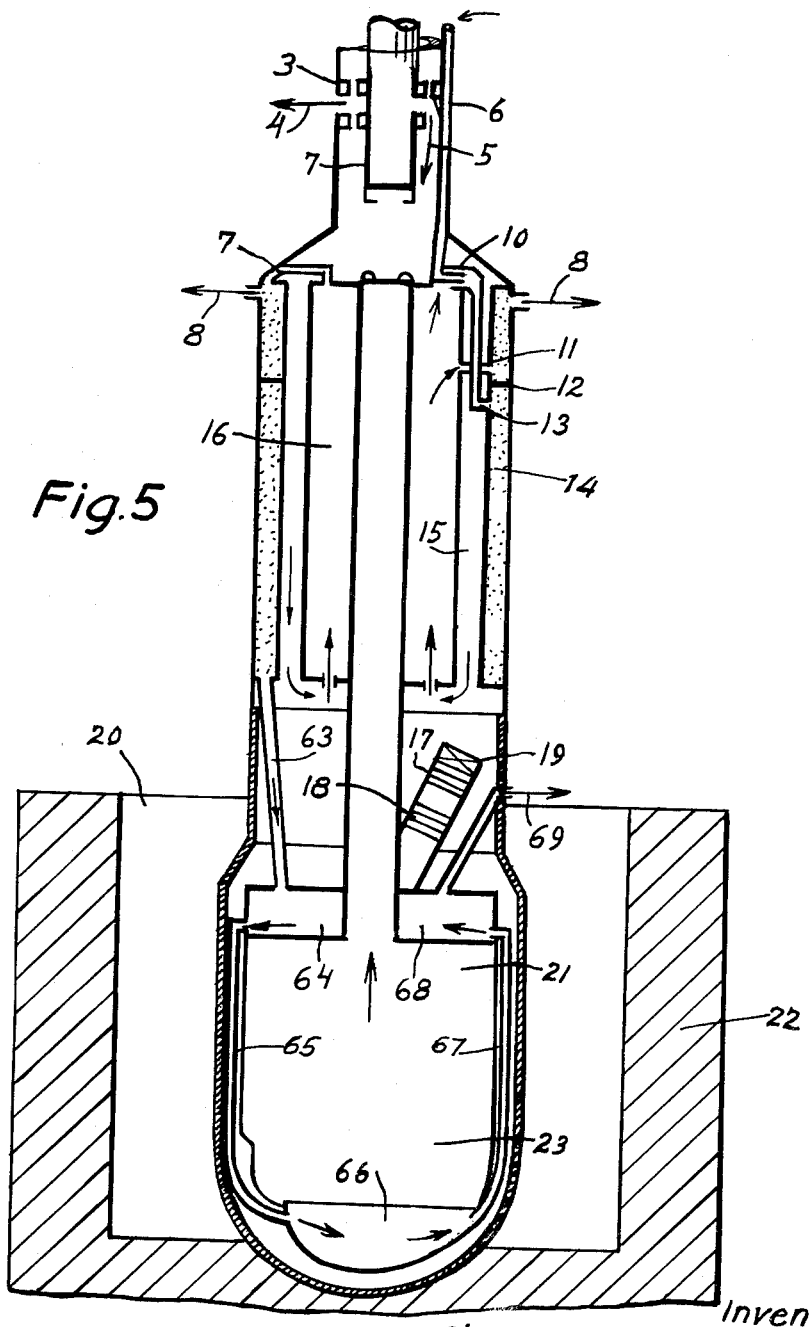

July 26, 1966  G. SCHLICHT ET AL  3,262,857
UNDERGROUND MINING REACTOR APPARATUS
Filed March 27, 1963  6 Sheets-Sheet 5

Inventors
GÜNTHER SCHLICHT,
    deceased,
by Erika Schlicht,
    administratrix
HANS LANGE
By Krafft & Wells
    Attorneys Inventors
GÜNTHER SCHLICHT, deceased,
by Erika Schlicht, administratrix
HANS LANGE
By Krafft & Wells
Attorneys

3,262,857
UNDERGROUND MINING REACTOR APPARATUS
Guenther Schlicht, deceased, late of Hamburg-Othmarschen, Germany, by Erika Schlicht, legal representative, Hamburg-Othmarschen, Germany, and Hans Lange, Wietze, Kreis Celle, Germany, assignors to Deutsche Erdöl Aktiengesellschaft, Frankfurt am Main, Germany
Filed Mar. 27, 1963, Ser. No. 268,498
Claims priority, application Germany, Mar. 29, 1962, Sch 31,216
8 Claims. (Cl. 176—39)

This invention relates to an apparatus for the treatment of bitumen in underground deposits by energy derived from nuclear fission.

In patent application Serial No. 216,702, filed June 8, 1962 (now Patent 3,236,739, dated February 22, 1966), an atomic reactor is described which, because of special structural features, is adapted to be lowered into a borehole while in noncritical condition, and after having been shielded from above, to be brought into critical condition. By "boreholes" are also meant shafts, because these are also produced during boring processes.

In the abovementioned case the reactor is positioned in such a manner that the greater portion of its energy will be liberated as heat, the nuclear radiation being effective within only a limited radius.

Nuclear radiation of any kind will ionize the atoms in its path. By such a process one or more of the electrons are removed from or added to the atom, so that they will no longer be electrically neutral.

Alpha rays are only slightly penetrating. Beta rays penetrate more deeply and give rise to X-rays. Gamma rays will penetrate through thick layers and can send out radiation with other wave lengths and set electrons free. The heat energy serves to prepare the bituminous strata for excavation and to assist therein.

The moderator which is heated by the flow of neutrons in the reactor and which serves as a cooling medium delivers its heat in a heat exchanger to a circulating heat carrying medium, e.g. liquefied bitumen or similar liquid, vaporized or gaseous material. By providing circulations in closed circuits between heat exchangers and through boreholes to include a continually widening area as described in patent application Serial No. 215,494, filed June 8, 1962 (now Patent 3,242,989), an underground deposit will be heated step by step and its bituminous content made suitable for complete removal.

In this manner there is first produced a change of viscosity, density, surface tension or state of aggregation of the bituminous materials in the strata, and any reactor which liberates the necessary amount of heat can be used.

Besides the liberations of neutrons, the reactor fuel undergoing nuclear disintegration will also produce alpha, beta and gamma radiation. It is known that these will cause chemical reactions in organic materials by the rupturing of valence bonds or the formation of free radicals. The extensive use of such methods in the chemical industries has, however, been prevented by the high cost of radioactive materials and by the required protection against such radiation.

It is an object of this invention, in underground strata or deposit where shielding against dangerous radiation presents no serious problem, to generate the required amount of heat by suitable combinations of chemicals in nuclear reactors. The fission products that are produced in the reactors can be used to contribute to the heat produced. The chemical and nuclear reactions, eventually in cooperation with catalysts, produce chemical changes in the treated bitumens which are irreversible. They can result in the production of desired structural changes with reduction of viscosity or with change of chemical properties, and by their effect on the hydrocarbons accelerate and facilitate the working of the deposit.

As is described in patent application Serial No. 216,702, filed June 8, 1962, the spent and strongly radiating fuels or solutions thereof are taken from the reactor and transferred to a container in a chamber at least 500 meters underground. In this chamber the radioactive materials are allowed to remain for some time until the radioactivity of the shortlived products has subsided sufficiently to permit the fissionable material still contained therein to be brought to the surface of the ground for recovery. This chamber will in the following be denoted "decay container."

It is now being suggested that the radiation which is being produced during this decay period be applied to initiate nuclear chemical reactions with the hydrocarbons in the bituminous strata. The liquid, vaporous or gaseous products which can, on occasions, be pretreated in a heat exchanger connected to the power reactor, are subjected over an adequate surface to the radiation in the decay container, with due consideration to hydrocarbons to be treated, to the intensity of the radiation, to the desired or required time of treatment, and to the temperature and pressure. The treated products are then returned to the stratum in a closed circulatory system. In this nuclear chemical reactor it is also possible to treat, not only the crude oil, tars, fractionation products of these materials or in admixture with other hydrocarbons, but also similar materials from other borings, and eventually with the addition thereto of radiation producing, inhibiting or controlling substances such as catalysts. The catalysts with the possible addition of other substances, can be delivered to the reactor by a separate conduit from above ground.

This underground chemical radiation treatment depends on the presence of an available supply of strongly radiating reactor fuel to replace the material that has been withdrawn from the service reactor, so that the nuclear chemical treatment can be continued after the thermal treatment. It is possible to carry out the thermal and radiation chemical treatments underground simultaneously if in addition to the nuclear fission reactor, there is also provided an underground source of radiation in the stratum. This can consist either of strongly radiating fuels from other reactors, or of some definite source of radiation such as cobalt 60. The radiation material is preferably used in ribbon form, of about 1/10 mm. thickness. This radiation source that is to serve as a radiation reactor can be positioned in the immediate neighborhood of the nuclear fission reactor or in any other convenient place in the shielded underground space, as in the decay chamber where, after exhaustion of the nuclear fission reactor, it will be possible to refuel the latter with radiating materials. By the term "radiation reactor" as used here and in what follows is meant a source of radiation for initiating and maintaining a chemical reaction in suitable materials by means of ionizing nuclear radiation, as for instance a chemical nuclear reactor, X-ray tubes, etc.

A direct coupling of the power reactor with the radiation reactor is provided if the hydrocarbons are conducted around or through the reflector which envelopes the reactor. The active alpha, beta and gamma rays which are produced by reflection and slowing down of the neutrons, and which will penetrate through the relatively thin layer of reflecting liquid, will bring about the required changes in the hydrocarbons. If it is desired to change the amount of radiant energy, then this can be done very conveniently by changing the duration of the treatment. If, for example, the energy is to be increased, then that can be done by changing in a known manner the surface of contact and the contact space.

The cooling medium which circulates between the nuclear fission reactor and the heat exchanger, which in this case is water or aqueous solutions or suspensions, can also serve as moderator in the reactor.

If graphite is used as the moderator, then the cooling medium can still consist of the above-mentioned materials.

If water alone is used as the moderator and cooling medium, then it will take up radiations in the reaction chamber, even if in only small amounts, and will give these up again in the heat exchanger. In the heat exchanger, however, such radiation activity is only weak.

In order to have the heat exchanger function more actively as a radiation reactor, it is suggested to add some materials to the moderator or to the cooling medium which in the reactor would produce isotopes from the fission products. Water insoluble materials are especially useful for this purpose. The resulting isotopes are strong radiators, and their radiation will act upon the hydrocarbons while the isotopes are circulating in the heat exchanger. After having been circulated for some time they can also be permanently deposited in specially prepared filters in the heat exchanger; namely, in the neighborhood of the circulating envelope of hydrocarbons.

A stronger functioning of the heat exchanger as a radiation reactor can be achieved if the fissionable material is added to the water in the form of a suspension. Such a suspension will flow through the reactor core and through the heat exchanger as both a moderator and a cooling medium.

For greater simplicity the fissionable material can be in the form of a salt that is soluble in the moderator or cooling medium so that it can serve as a neutron source in the nuclear fission reactor and as a radiation source in the heat exchanger, between which the cooling medium and at times also the moderator with the fission products contained therein will be kept in closed circulation.

The heat exchanger can advantageously be provided with chambers, traps, filters or settling zones which will cause the radiating material to remain in the exchanger for a longer period of time, whereby the danger of corrosion or erosion is reduced.

The combined thermal and radiation treatment of the hydrocarbon oils can be varied in different ways, depending on what effects are desired. Either the entire amount of bitumen or only a portion of it can be passed through either the entire heat exchanger of a nuclear fission reactor or through only a larger or smaller portion thereof, whereby the thermal action is either increased or diminished according to the extension of the surface available for heat exchange. This oil, which may or may not have been pretreated, is then passed through a radiation reactor or a portion thereof or through several such reactors of different strengths or of different kinds (alpha, beta or gamma radiators), and is thus exposed to varying amounts of radiation treatment depending on the length of the path of travel.

The effectiveness of the available radiation intensity can also be increased by providing in the reactor above and below the reaction chamber an open space about 50–100 mm. high through which the hydrocarbon mixture is conducted for treatment by the radiation.

It is also possible to provide another chamber above or below the service reactor and directly connected thereto so as to be within the range of the thermal neutrons and short lived isotopes, whose activity can be increased by the additional introduction of fissionable material. The oil can then be subjected to the radiation thus produced by passing it through pipes around or through such chamber.

Besides the bituminous materials, the strata may also contain other materials such as inorganic salts, suspensions or admixtures—partly in the oil itself or dissolved or suspended condition in the aqueous phase designated as edge water. It is, therefore, necessary to reckon with the fact that some of these substances will form isotopes with long half periods during such radiation treament. Such radiating materials can be useful for underground circulation since they would cause nuclear chemical reactions in the strata.

It is also further suggested to modify or extend the radiation chemical treatment in the underground strata themselves, or to aid or strengthen such treatment by the addition from above ground to the circulating heating medium, of strongly radiating isotopes such as argon.

During the subsequent working of these strata, such added materials can, however, prove troublesome. For their removal, and before their arrival at the casing head of the borehole, the circulating materials should first be passed through radiation measuring devices and then through filters, ion exchange resins, dehydrators, salt removers, etc. Even if that stratum under treatment is not being subjected to such radiation treatment, it may still be advisable to use such precautionary measures when radiation treatment is being applied to other strata in the same circuit. If the heat carrier medium to which the radiation treatment is to be given is a distillate from the bitumen in the stratum, there will be much less tendency to form dangerously radioactive substances.

As a moderator and reflecting material for the neutrons used in atomic reactors, use is made mainly of ordinary water or heavy water, where the neutrons act mainly upon the hydrogen. Hydrogen containing organic substances can also be used as moderators and cooling materials. Especially suitable for this purpose, because of their great stability against radiation, are the aromatic hydrocarbons of the polyphenyl series, such as diphenyl, o- m- and p-triphenyl and p-quadriphenyl. Other hydrocarbons such as the paraffins do not possess this stability against radiation so that they would not be suitable for use as moderators or reflection liquids for normal reactor operation with closed systems. For underground reactors, however, which are for thermal and nuclear chemical action on the bituminous components of the stratum, their use as moderators and reflection liquids is not only possible, but specifically advantageous. When such materials are used they can be passed rapidly through the radiation zone of the reactor so as to make it unnecessary to always subject the same portion of the material to long continued radiation treatment.

It is, therefore, furthermore suggested to conduct the heating fluid derived from the stratum directly through the reactor chamber and then through the reflector and from there to conduct it again into the stratum so that the material serves not only as a modifier and cooling liquid but also at the same time is heated and chemically modified with change of viscosity. A selective and desired radiation treatment of the medium in the reactor chamber can be obtained, even with outlet conduits of fixed dimensions, by varying the amount of the fluid and thereby its temperature, its pressure, and the duration of its flow. The treatment is further controlled by selection and formation of the flow paths in the reactor and by the kinds of shielding shells for the reactor fuel, as well as by the addition of foreign materials or catalysts. The composition of the heat carrying medium should be given special attention. Substances which are known to be reactor poisons and which may occur in the bituminous strata or in the edge water, must be removed before entering the reactor, as for example, substances which produce strongly radiating isotopes. For their removal, use may be made of contrivances such as are described hereinabove.

It is naturally also possible, instead of using the bitumens of the stratum, to use other hydrocarbon mixtures which are passed through the reactor, but are then not released in the strata but is returned to the top through the annular space between two coaxial tubes in the borehole. In such a case the radiation effects would be more nearly negligible because the composition of such a mixture would not be as complex as when natural bitumens are used, but there may be some cracking or polymerization.

If a second supply conduit is provided, additional substances can be added such as a reaction partner for reacting with the products produced by the radiation.

It is also possible, by means of strong X-ray tubes or other devices for producing hard radiation, to treat the heat carrying medium in the casing head at the top of the borehole.

It will be advisable to periodically test the effectiveness of the heating fluid as a moderator or a cooling medium and as a reflection liquid, because its composition and properties may change as the level of the stratum from which it is taken changes. Such testing can be done with a small radiation detector above ground. As a reactor model, an X-ray tube or a small amount of radioactive cobalt can be used, sufficient to irradiate 1 cm.$^3$/h.B. Behind this experimental reactor are arranged two counting tubes at the beginning and at the end of a longer measuring distance, from the difference between the readings of which it can be determined whether isotopes with long half periods were formed.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

FIGURE 4 illustrates a schematic, cross-sectional view through a decay container placed underground but above an underground nuclear reactor showing conduits for delivering the heat exchange medium to and from the nuclear reactor;

FIGURE 5 illustrates in schematic and cross-sectional view a modification of FIGURE 1;

Figure 1:
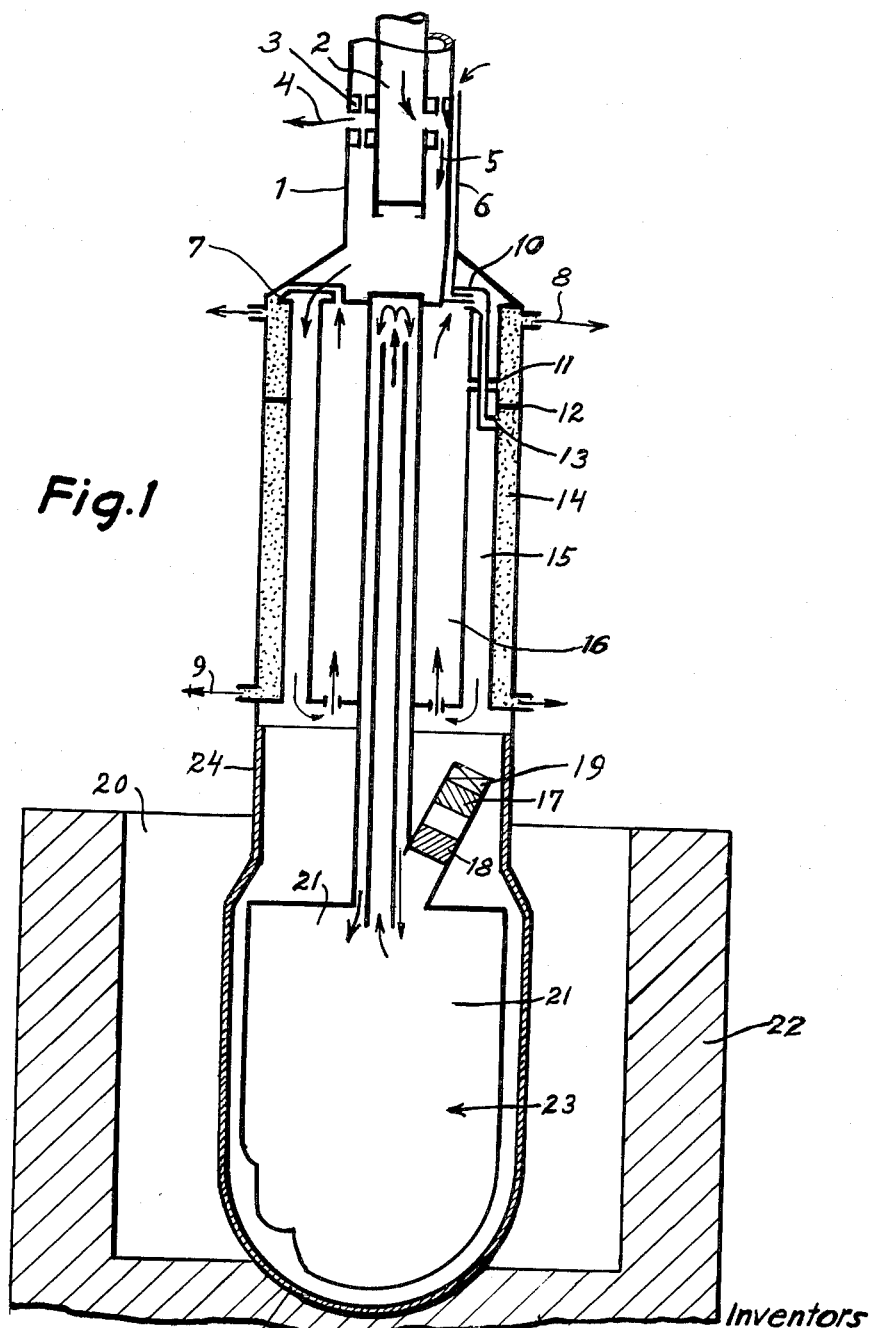
FIGURE 1 illustrates a schematic, cross-sectional view through an underground nuclear reactor with heat exchanger and means for passing the heat exchange medium or portion thereof along radiation sources placed at various locations.

In FIGURE 1 there is shown a combination of a nuclear power reactor for thermally treating bituminous substances combined with radiation sources arranged in various manners for radiation treatment of such substances.

In the following, the term "power reactor" is being used for designating a nuclear reactor capable of sustaining a chain reaction of nuclear fission processes. The term "radiation reactor" is being used mainly for an arrangement in which a source of nuclear radiation (alpha, beta, gamma rays) subjects material to such radiation.

Since a radiation reactor is rather simple in design and in the following no distinction will be made between a radiation reactor with a solid radiation source such as cobalt 60, a radiation reactor having a pipe system using radiating liquids, and a radiation radiator of the apparatus type such as X-ray tubes or neutron accelerators.

Proceeding now with the detailed description of FIGURE 1, there is an outer pipe or pipeline 1, receiving an inner pipe 2, and in the latter the heat exchange medium, i.e. the medium, usually a liquid, to be heated by the power reactor, is supplied to a distributor 3 having a connection at 4 to the exterior of pipe 1 for feeding said medium directly into the substratum such as an underground deposit. This mode of operation is being used whenever the power reactor is to be by-passed without heating up the heat exchanging medium, for example, for reducing hot spots near the reactor.

Since the primary function of the power reactor is to heat up the heat exchange medium, and since the latter serves primarily to transfer such heat into underground deposits, this heat exchange medium will in the following be called "heating fluid," and comprises bituminous liquids, vapors, or gases or fractionated products of such material.

Normally, guiding cams of the distributor 3 are placed at position 5 so that the heating fluid can pass into a channel 15 and entering the heat exchanger 16 from below (see upwardly directed arrows). In a ring-cylindrical heat exchanger 16 the heating medium when passing through is subjected to nuclear radiation from the reactor coolant having itself been heated by fissionable material 23 in a reactor chamber 21 containing the core; heating occurs when the reactor is in a critical state sustaining a chain reaction.

The heating fluid leaves the heat exchanger 16 at an elevated temperature through a conduit line 7 into the supplemental radiation reactor 14. The radiation reactors 14, 14c, 14d, etc., are comprised of intensively radiating isotopes such as cobalt 60 secured to suitable walls at various locations thereof. In order to attain different types of radiation treatments and reactions there may be provided different passageways for the heating fluid along different radiation sources.

The left-hand portion of FIGURE 1 illustrates passages in which a relatively little treated heating fluid portion can enter the substrata through exit 8, while a heavily treated heating fluid portion passes into the substrata through a lower positioned exit 9.

The right-hand portion of FIGURE 1 illustrates a pipe 6 descending from the surface and through which is fed a portion of the heating fluid so as to pass it into a mixing injector 10 from which a portion can enter through an outlet 13 into the lower and larger section of radiation reactor 14 wherefrom the medium is discharged through exit 9 into the substrata.

Another less heated partial flow is tapped from heat exchanger 16 at channel 11 and enters the underground deposit through aperture 8 at the upper and smaller portion of radiation source 14. A separating sheet 12 divides the radiation source 14 into two sections enabling selective dosing of the effective radiation intensity.

Chamber 22 formed of cement or concrete walls and located in an enlarged portion of the borehole has reflector shield 20 located therein.

In patent application Serial No. 216,702, filed June 8, 1962, is disclosed a reactor with means to provide for a reserve quantity of fissionable material which can be fed into the reactor chamber in addition to the already present fissionable material so as to selectively increase the fission rate. This provision is not used if the fissionable material is employed as a solution after the reactor chamber has been emptied, because the discharged reactor fuel is then brought into a decay container which serves as a radiation reactor.

In accordance with a further feature of the invention, FIGURE 1 illustrates provision of two separated reserve fuel masses 17 and 18 of fissionable material which can be charged simultaneously into the reactor chamber 21 by a propellant located at 19. In this manner a critical or supercritical mass can be formed.

The protective shield 24 made of stainless steel serves to collect material leaking from the reactor so as to actuate a signaling device in the bottom 25.

Figure 2:
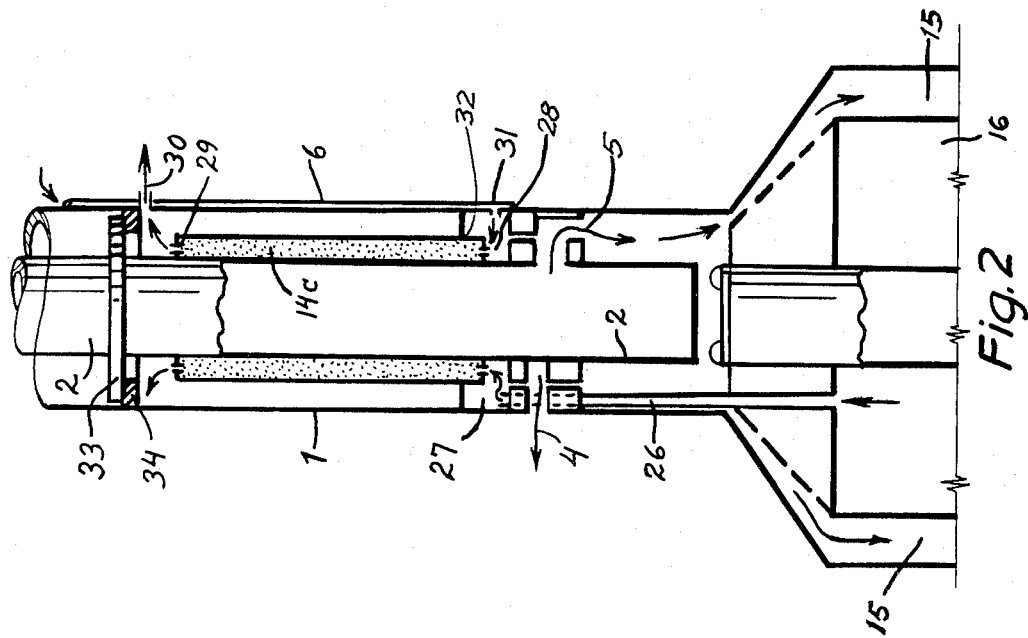
FIGURE 2 illustrates schematic cross-sectional view through a heat exchanger cooperating with an underground nuclear reactor and exhibiting a flow pattern of the heating medium modified from that shown in FIGURE 1.

In FIGURE 2 there is shown a radiation reactor 14c installed completely separated from the power reactor and the devices associated therewith. Radiation reactor 14c is attached to an ascending pipe 2 disposed inside tube or pipe 1; reactor 14c will thus be installed or removed together with pipes 1 and 2. Such arrangement is of advantage whenever the radiation source serving as radiation reactor is one of high intensity, for example, a gamma ray source of long half life period, and which is to be used in several borings. Also, the previously fissionable but exhausted power reactor fuel material can be filled into this container to form radiation reactor 14c.

In FIGURE 2 there is also shown the following flow path. The heating fluid as above described flows from pipe 2 by way of duct 5 and downwardly channel 15. The heating fluid then enters the heat exchanger 16 of the power reactor through appropriate apertures as shown in FIG. 1. Heated and radiation-treated heating fluid is discharged from the heat exchanger (see upwardly directed arrow) and passes through a conduit 26 so that the fluid now can enter chamber 27, then passing through openings 28 and to the head or top of the radiation reactor 14c. The heating fluid then leaves radiation reactor 14c through an aperture 29 thereof and passes into the stratum and underground deposit through an exit opening 30. If a different fluid is being used for heat exchanging, this will enter chamber 27 from pipe 6 through aperture 31.

There are provided yielding separating bars 32 providing sealing only as against any pressure difference caused by the flow resistance in a limited portion of the radiation reactor. The pipes 2 engage a ring 34 via sealing ring or gasket 33.

Figure 3:
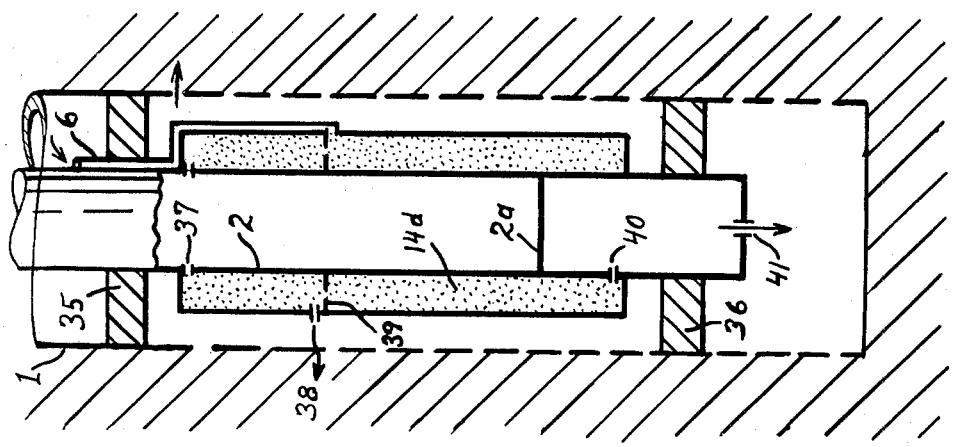
FIGURE 3 illustrates a schematic, cross-sectional view through an underground radiation treatment device.

In FIGURE 3 there is illustrated a radiation reactor used by itself, i.e. without being connected to a power reactor and which can be used below the surface. Again, the radiation source itself may be material exhausted as to its fissionable content derived from a power reactor installed elsewhere. Such material had served as radiation reactor in the moderator and/or coolant of such remote power reactor. This material can be used and required when it is desired to provide for a minor or directed radiation-chemical treatment of the material drawn from underground deposits or of hydrocarbons having been placed from above into the borehole for radiation treatment.

The radiation reactor disclosed here may be used for radiation treatment of already heated heating fluid pumped into the underground deposit in a manner as otherwise disclosed for bore II of patent application Serial No. 215,494 filed June 8, 1962.

Within the perforated area of the pipeline 1 two spacers 35 and 36 retain the pipe 2 therein securely. The radiation reactor 14d is attached to the pipe 2. For radiation treatment there are provided the following possibilities: A partial flow derived from the fluid material passing through pipe 2 enters the upper section of the radiation reactor 14d through an aperture 37 thereof, then passing on partially through aperture 38 into the perforated area of pipeline 1 and from there it flows out into the underground deposit.

For stronger radiation treatment, another portion of the heating fluid may enter the radiation reactor 14d through a pipe 6 below the narrowed portion 39. The thus treated fluid then passes through openings 40 and 41 into the lower pipeline portion separated by spacer 36 from the remainder of pipeline 1. Then this portion of the heating fluid passes on through the perforations of pipeline 1 into the underground deposit. Partition 2a divides pipe 2 into two sections.

The application of fissionable material in a dissolved state or as suspension has the advantage that its amount and thus its energy can be altered at will in the power reactor chamber. However, a certain amount must then be kept in reserve, and for safety reasons must be stored below the surface. A suitable design for the borehole section containing the stored fissionable material and the decay container is shown in FIGURE 4, and it will be explained, how in such case a power reactor can advantageously cooperate with a radiation reactor.

The pipeline 42 is covered by a cement layer 43 extending below the lowest underground water level. The perforated ring chamber 44 is disposed directly below the border of the cement layer. Ring chamber 44 communicates with two pipes 45 and 46 for controlling and flushing from the surface so that any radioactive contamination of the lower portion of the borehole can readily be detected.

Since cement layer 43 enclosing the borehole interior must not be endangered by any shocks but must maintain a seal against the lower borehole portion, a highly viscous thixotropic liquid 47 is introduced between pipeline 42 and the borehole wall below the flushing chamber 44 and extending up to the foot of pipeline 42.

Pipeline 1 is built into pipeline 42 and is connected to an outer pipeline 48 at a level depending upon the individual circumstances. Connection is being made in that the interior of pipeline 48 forms a closed space sealed by a lid 51.

The power reactor is lowered to the underground deposit by means of the pipeline 1. The latter is sectionwise sealed against the rocks by means of cement or a highly viscous liquid.

A ring-shaped packer 49 is mounted in-between pipelines 42 and 48 and being submerged in thixotropic liquid 47. A probing or testing pipe 50 communicates with ring packer 49 leading upwardly to the surface so that also this area can be tested as to radioactive radiation.

In the interior space defined by pipeline 48 there is mounted a holder 54 receiving and supporting a decay container 52 and a storage tank 53 so that the latter two can be removed upwardly from pipeline 48 after removal of lid 51 enabling placing of the two containers 52 and 53 into a radiation proof transport container still inside of the borehole.

In case a portion of the dissolved fission material in the power reactor placed below is to be exchanged, a suitable liquid, for example, benzene or an inert gas is pressed into storage tank 53 through pipe 55 so that now fissionable material can pass on and into the power reactor chamber (not shown) through descending pipe 56 (shown schematically only). Fuel thereby expelled from the reactor can simultaneously be delivered into decay container 52 through an ascending pipe 61, being also shown schematically only.

Fission products together with exhausted fuel remnants thus deposited into container 52 now can, as was described above, emit radiation energy to the heating fluid passing through pipeline 2 to the power reactor below. Hence, decay container 52 serves a radiation reactor.

If decay container radiation reactor 52 is not required for treating the heating fluid, any other fluid, for example, hydrocarbons can be fed to decay container 52 for subsurface radiation treatment.

If after the decay period, all the reactor fuel is to be removed from the borehole, it will be possible either to dismount the container 52, or to force the reactor fuel out of container 52 through pipes 59 and 60 by means of a liquid so as to be charged into radiation proof transport containers. If gaseous products resulting from fission are produced in container 52, these gases can be discharged through pipes 59 upwardly to the surface.

Control valve 62 governs the down flow of heating fluid to the reactor through pipe 2.

FIGURE 5 illustrates a device in which the particularly intensive radiation of the power reactor itself is used directly and additionally to radio-chemically treat hydrocarbons. The reactor 21 with reflector 20 is installed in a cement chamber in the lower enlarged portion of the borehole. Two semi-annular chambers 64 and 68 are provided directly in the reactor chamber 21 at the top of the reactor core and a round chamber 66 is provided at the reactor bottom. These chambers serve to receive the fluid to be treated by radiation.

The heating fluid coming either from heat exchanger 16 or from radiation reactor 14 and having been heated in the reactor chamber, flows through a channel 63 into semi-annular chamber 64, passes through channel 65 and into the lower radiation chamber 66, and from there through a channel 67 into the second semi-annular chamber 68. The heating fluid is subjected to an extraordinarily intense radiation in these chambers, which radiation comes from reactor core 23 which may be constructed and controlled as in Serial No. 216,702, filed June 8, 1962. The heating fluid is being discharged from the reactor into the underground deposit through pipe 69.

Treating chambers 64 and 68 at the top of reactor chamber 21 are connected to the bottom chamber 66 through pipes 65 and 67.

It is possible to substitute a ring-shaped gap around the reactor chamber 21 for the pipes 65 and 67.

Otherwise the arrangement is similar to that shown in FIGURE 1.

Figure 6:
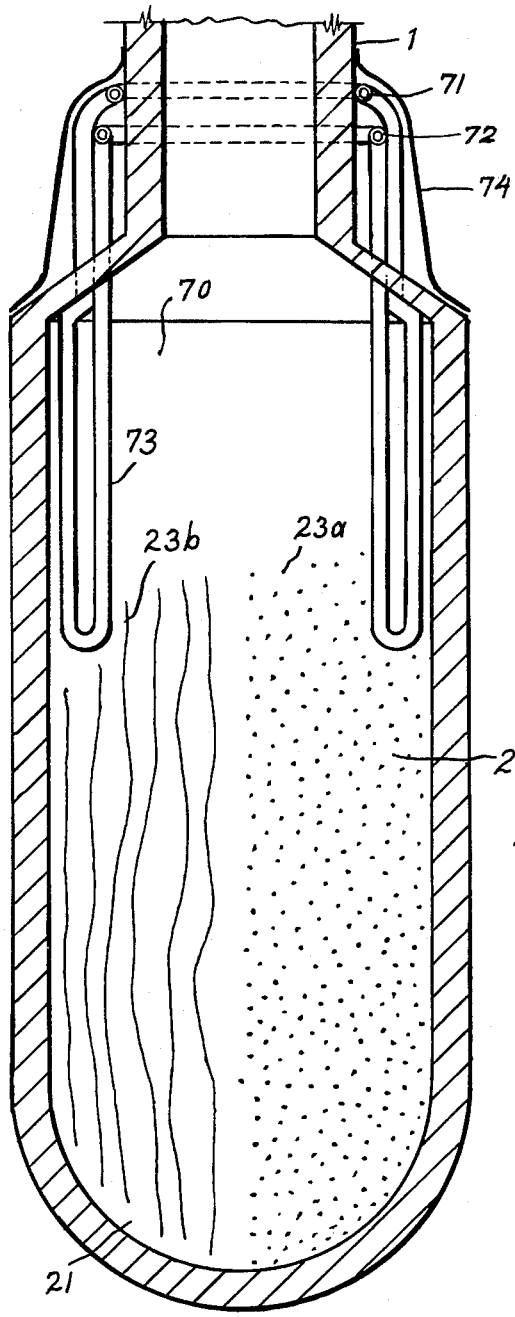
FIGURE 6 illustrates in a modified embodiment of the invention a nuclear reaction chamber serving directly for supplemental radiation treatment.

FIGURE 6 illustrates that a fission reactor chamber 21 itself can be enlarged in upward and/or downward direction, for example, by an upper chamber 70 for utilizing the intensive radiation from and in the power reactor chamber 21 for radiation treatment of the bituminous fluid. For this purpose, the collecting pipes 71 and 72 having heating loops 73 run into this chamber 70 to the top or bottom of the reactor chamber 21 so that the reactor fuel itself such as particles or strands 23a or 23b or mixtures thereof actually come close to the heating coils 73.

Collecting pipes 71 and 72 can be connected to the heat exchanger (as at 16, in FIGS. 1, 2 and 5) so as to form a structural unit. The pipes 71 and 72 have a protective sheet 74.

The aforedescribed embodiments comprised of various modes of combining a nuclear power reactor with a nuclear radiation reactor wherein the latter can be found at various places along the travel path of the bituminous fluid pumped from the surface into the underground for heating and radiation treatment and final discharge into underground deposits. In the following, a numerical and otherwise specific example is being given to show such combined underground treatment of crude oil.

A combined power and radiation reactor for use in a 1250 m. deep borehole with the fission reaction chamber having an outer diameter of 300 mm. is assumed. Crude oil or fractions thereof free from reactor poison may, for example, be heated and treated with nuclear radiation. Catalysts or other additives may be added producing short living isotopes in the reactor chamber. This heating fluid is to be heated for lowering the viscosity and is to be transformed by chemo-radio-reaction into a different type of hydrocarbon. For example, $C_4H_{10}$ into $C_8H_{18}$ and $C_8H_{16}$; mercaptanes are transformed into easily removable sulfides. This double task reduces the thermo power of the reactor by 10 to 30% measured relative to the volume of the cylindrical reactor core.

The thermo power output may be 750 megacalories per hour thus increasing about 8000 liters oil per hour by approximately 225° C. This temperature increase amounts to a corresponding heating of 2.21 (about half a gallon) per second. The radiation doses can be computed and results from the other operating conditions such as the shape of reactor chamber, including that of the reflector, the heat exchanger, the decay container and the activating period, i.e., the time the heating medium is exposed to the radioactive radiation. All these influences determine the radiation doses per liter.

The decay container contains exhausted reactor fuel being about 1 to 2 months old and amounting to .85 kilogram. The heat exchanger is encased or enclosed by a layer of cobalt 60, finely divided deposited on the output side of the heat exchanger. The reactor core contains about 3.68 kilograms uranium 235 enriched by 90% and being mounted as a ribbon. 125 liters of ordinary water serves as a moderator. This water operates as thermosyphon circulating between reactor core and heat exchanger and 300 grams natural uranium is finely divided and in suspension in the moderator water. The fission product will become strongly radioactive when passing through the reactor core and in about 3 to 4 months suitably prepared surfaces and pockets will receive this product as deposit. Now finely divided uranium can be fed repeatedly to the head of the reactor chamber from the reserve fuel masses 17 and 18. The heating medium after having passed through the heat exchanger and the reflector is being discharged to the underground deposits through U-shaped pipes. There are thus employed various radiation reactors producing the following results:

*Table of radiation*

| Place of Radiation Reactor | Intensity in megaelectron volts per second | Amount treated, liter per second | Exposure Time | Radiation doses in megaelectron volt per liter |
|---|---|---|---|---|
| Along the decay container | $4.9 \times 10^{14}$ | 2.22 | 261 | $5.7 \times 10^{16}$ |
| Cobalt in and around the heat exchanger | $8.9 \times 10^{13}$ | 2.22 | 495 | $1.98 \times 10^{15}$ |
| Radiation reactor on primary side of heat exchanger | $8.2 \times 10^{14}$ | 2.22 | 230 | $8.4 \times 10^{16}$ |
| U-pipes extending into the reactor chamber near the head of the reactor core | $8.7 \times 10^{15}$ | 2.22 | 41 | $1.67 \times 10^{17}$ |
| As liquid through the reflector | $6.2 \times 10^{15}$ | 2.22 | 48 | $1.34 \times 10^{17}$ |

Each liter oil heated by 225° C. and receiving $4.65 \times 10^{17}$ megaelectron volts per liter.

Figures 7, 7A, 7B:
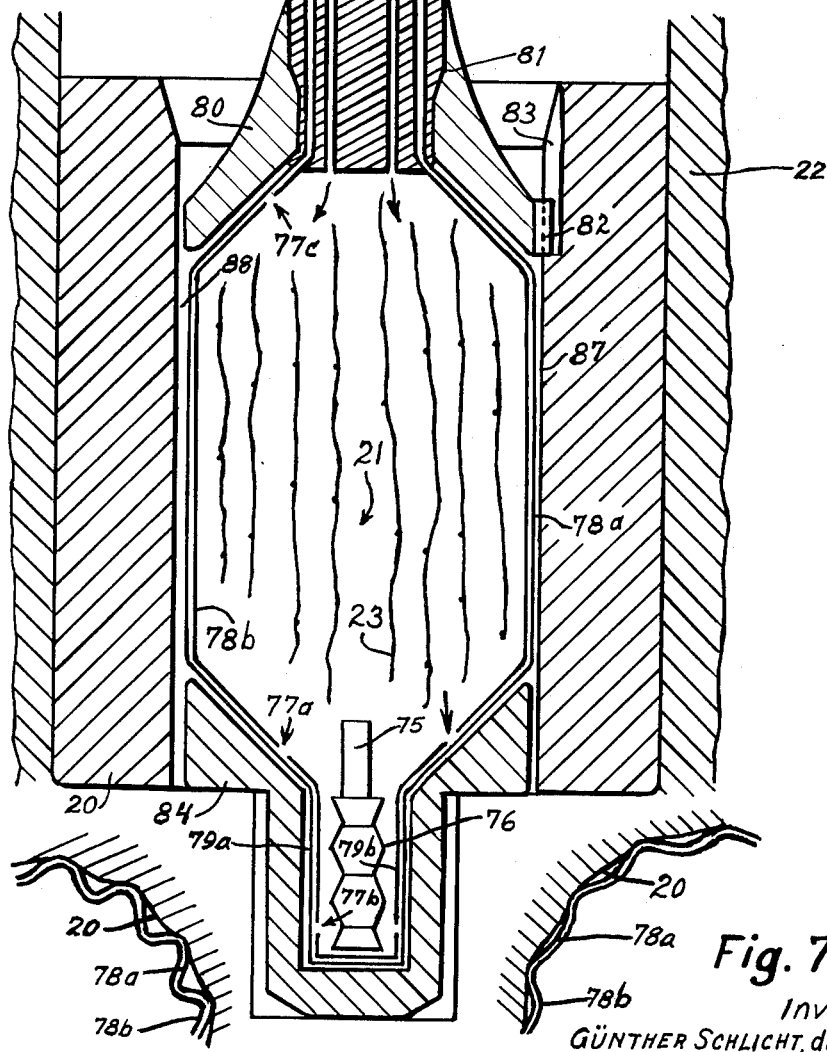
FIGURE 7 illustrates a schematic cross-sectional view through an underground nuclear reactor in which the moderator is being continuously fed to and drawn from the reaction chamber.
FIGURES 7a and 7b illustrate fragmentary sectional views of a detail of the deflateable reactor of FIGURE 7 in different operating conditions.

FIGURE 7 illustrates a chemo-nuclear power reactor in which the moderator is used as a coolant as well as heating fluid. For example, bitumen or fractionation products thereof coming from the underground deposit, or other hydrocarbons are mixed as desired so as to form new compounds by additionally subjecting them to pressure, radiation, heat and catalyst action.

The heating fluid passes down through pipeline 2 and enters heat exchanger 16 through channels 15 wherefrom it then enters the power reactor chamber 21 flowing around the fissionable reactor fuel 23. The reactor diameter and the ratio of fissionable material to moderate is selected so that the heating medium-moderator creates critical conditions in the fission-reaction chamber 21.

The encased fission material 23 has tubular round or threadlike configuration. Glass or stainless steel serves as encasing material, or one can use material permitting a particularly small reactor diameter for becoming critical, i.e. for sustaining a chain reaction. In this example the power reactor itself serves as radiation reactor.

The combined reactor is installed in subcritical condition. However, a hydrocarbon filling is required since otherwise the reactor would collapse under the pressure existing below the surface. Hence, the reactor will originally be filled with highly viscous mixture of hydrocarbons such as paraffin, heavy machine oil, etc., having in fine suspension "reactor poison." The thus prepared reactor is installed and after connecting and encasing it so as to be radiation proof, the reactor is rendered critical as to chain reaction. For this purpose the aforementioned highly viscous mixture with the "reactor poison" such as a neutron absorber are flushed out of the reactor. The control device 75 has the purpose to avoid excessive temperatures and/or excessive pressures and actuates a Bourdon tube 76 in the form of a bellows 76, i.e. a temperature responsive bellows. Accordingly, power loss due to used up fissionable reactor is balanced by this control rod 75.

The heating fluid moderator when passing into and through reactor chamber 21 is highly heated as well as subjected to alpha, beta and gamma rays in cooperation with coolant and moderate action. The operating conditions in chamber 21 determine the reaction of the passing materials. It is also possible in this type of reactor to charge the reactor chamber 21 with additional materials such as hydrocarbons, catalysts or any generally reacting chemicals to form compounds with the heating fluid. The additional substances reach reactor chamber 21 through a special pipeline 6 (see also FIGURE 1) and are thus separately introduced in the reacting system.

It is essential that the moderator and coolant pass through the reactor only once. The additional charged substances or compounds formed can escape from reactor chamber through apertures 77a, 77b and 77c. These apertures are selected so that the main discharge is carried out through aperture 77a. The amount of fluid to be discharged through aperture 77b merely suffices so that temperature responsive bellows 76 can in fact, control the position of control rod 75 relative to the fissionable material and moderator liquid. Aperture 77 serves as escape for the reaction gases produced in chamber 21, during the combined fission and chemical reactions. Profiled sheets 78a and 78b serve as discharge channels communicating with discharge openings 77a, 77b, 77c.

The profiled sheets 78a and 78b are contiguous with bottom sheets 79a and 79b provided at the bottom of reaction chamber 21 and around control device 75, 76. At each side of sheets 78a, 78b, 79a and 79b there is practically similar pressure so that the sheets can be thin indeed. They may even have wave-shape so that upon a slight increase of the pressure in the chamber interior, the diameter thereof is appreciably enlarged. These wave shaped sheets engage more or less the wave-shape profiled inner surface of reflector 20.

This reflector 20 is made of segments consisting of suitable resistive material having a large wall thickness and resting against the concrete wall 22 in the borehole. Hence, large pressure may be used in reactor chamber in spite of the sheets 78a and 78b being thin.

At top and bottom of reactor chamber 21 there are acting also strong pressure forces. For taking up these forces pipeline 1 is secured to a head piece 80. This head piece 80 supports heat exchanger 16 in cooperation with the connecting conus 81. Sheets 78a and 78b are also secured to head piece 80.

In order to orientate sheets 78a and 78b with respect to reflector 20 for a correct relative position, head piece 80 is provided with a guiding cam 82 projecting for guidance therein a slot 83. A foot 84 is connected to sheet 79b at the bottom of reactor chamber 21 which foot 84 rests against the borehole bottom so as to transmit positively thereto all downwardly directed forces in and from the reactor chamber.

FIGURES 7(a) and 7(b) illustrate how sheets 78a and 78b become more flat upon increasing the interior pressure. Hence, there is a possibility to introduce these sheets 78a and 78b at a small diameter with strong wave profile, and after completion of such introduction the sheets will be enlarged together with the diameter of the reactor chamber 21 itself.

FIGURE 7 illustrates specifically at its right-hand side a relatively narrow gap 87 between reflector wall 20 and the outer reactor sheet 78a. At the left-hand side of FIGURE 7 there is a relatively enlarged gap 88, also defined between reflector wall 20 and sheet 78a.

Normally, the heating fluid moderator is discharged into the underground deposit through aperture 9 as aforedescribed. The spacer 86 prevents such liquid from entering ring chamber 85 between pipelines 1 and 2. If one removes spacer 86, and plugs up aperture 9 but permits ascending of the heated and radiation treated liquid, the latter may be used above the surface and not underground.

The wavy shape of sheets 78a and 78b can be used additionally or alternatively in that at similar inside and outside pressure, the reactor has its smallest diameter and is subcritical as to a sustained fission chain reaction. Upon increase of the inner pressure, the "waves" unfold and enlarge the diameter of the reactor core placing the reactor into critical condition. After the fissionable fuel has been exhausted in the reactor core, heat exchanger 16 is pulled off its conical seat 81 by means of pipeline 2 whereby the easily deformable walls 78a and 78b with the fuel and fission products are pulled upwardly to the surface through pipeline 1.

In the following a specific example of operating a reactor structure as shown in FIGURE 7 is described with numerical data.

Assuming the reactor structure is lowered into a blind borehole being 150 m. deep. The reactor chamber 21 has an inner diameter of 650 mm. with a reactor core volume space of 208 liter producing 15,000 kilocalories per hour and liter; the reactor core is cylindrical the total power output is $3.1 \times 10^6$ kilocalories per hour.

Since this is a combined power and radiation reactor, 8% of the aforementioned total power output is effective and being received as radiation output in the moderator and the reflector, assuming hydrocarbon fluid serves as moderator, coolant and liquid in the reflector. For example, n-butane hydrocarbons are passed through pipeline 2, heat exchanger 16 into the reactor chamber 21 leaving the latter at outlets 77a and 77b whereafter this heating fluid-moderator passes again through heat exchanger 16 and into pipe 1 for appearing again at the surface.

These n-butane hydrocarbons are being heated up to 245° C. 123° thereof are drawn from the heat exchanger, and 122° are directly heating power in the reactor core. The 8% radiation power produce 248 megacalories per hour effective at 95% in the hydrocarbons used as heating medium. The heating at 2850 megacalories per hour result in the 122° C. temperature increase at a flow rate of 46.8 cubic meters per hour or 13.0 liters per second. The radiation power output of 248 megacalories per hour times 95% result in 65.2 kilocalories per second, divided in 41.0 kilocalories per second in the core and 24.2 kilocalories per second in the reflector.

Radiation power in core is 41.0 times 2 times 614 times $10^{16}$ which is $1.07 \times 10^{18}$ megaelectron volts per second.

Radiation power in the reflector is 24.2 times 2 times 614 times $10^{16}$ which is $0.63 \times 10^{18}$ megaelectron volts per second.

Exposure time in the reactor core is 208 over 13.0 which is 16 seconds. The reactor core has a volume of 85 liters and effects an exposure time for radiation treatment of 6.5 seconds. The radiation doses in the core is $1.07 \times 10^{18} \times 16.0/13.0 = 1.32 \times 10^{18}$ megaelectron volts per liter and the radiation doses in the reflector are $0.65 \times 10^{18} \times 65/13 = 0.32 \times 10^{18}$ megaelectron volts per liter.

This adds up to total radiation doses of $1.64 \times 10^{18}$ megaelectron volts per liter, applied to n-butane at 245° C. Using catalysts, a high rate of transforming this hydrocarbon into octanes and octenes resulted therefrom.

Figure 8:
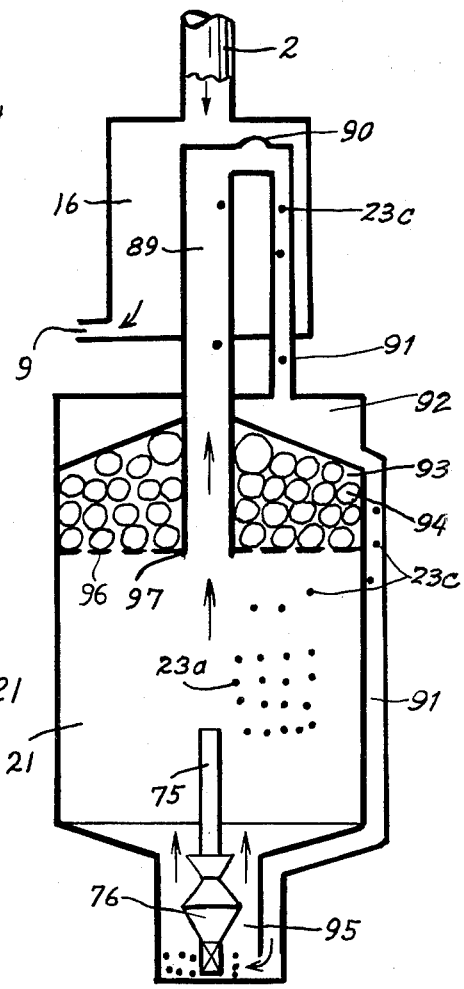
FIGURE 8 illustrates schematically a final embodiment of the invention in which part of the fissionable material of an underground nuclear reactor is being circulated through the heat exchanger.

Proceeding now to FIGURE 8 there is shown again a nuclear reactor for underground operation in borehole receiving a liquid such as crude oil through pipeline 2. This liquid is heated in heat exchanger 16 and leaves the same through aperture 9. The coolant-moderator heated in reactor 21 ascends through pipe 89 to the top of heat exchanger 16 passes therethrough (by losing its heat content). The fissionable particles 23c are suspended therein. The cooled coolant-moderator passes through chamber 92 and cools the same together with adjacent chamber 93. There is a return pipe 91 with a sump 95 for returning the coolant-moderator to the reactor chamber 21. In this circulation path very finely divided and actively fissionable fuel particle 23c can pass along yielding high doses of radiation energy in the heat exchanger. The other fissionable fuel elements 23a are too big so that they remain suspended in the upwardly flowing moderator. The upper portions of pipes 89 and 91 together with their communication form a loop in which flows fuel material 23c radiating towards the surrounding crude oil in heat exchanger 16. This loop here constitutes the radiation reactor.

If little or not heat is drawn in the heat exchanger, the flow speed is reduced in pipelines 89, 91 as well as in reactor chamber 21 so that a portion of the fissionable material particle 23a rests in sump 95 and the chain reaction ceases. Only if larger quantities of heat are being drawn so that the temperature in pipeline 91 drops, the precipitated particles 23a are being whirled up again and out of sump 95 into the reactor chamber 21.

This construction has the advantage that the Bourdon pipe 76 with conical control rod 75 is directly placed in the circulation path and the control effect of rod 75 is less effective when the reactor is either started or stopped.

In order to dampen vaporization impacts in the reactor, a damping chamber 93 is formed near the top of reactor chamber 21 being downwardly closed by a grid 96. Ascending pipe 89 protrudes with its lower pipe end 97 into the reaction chamber 21 so that gases from the coolant and/or moderator can collect in chamber 93. The bodies 94 serve for oxidation even at low temperature so as to absorb $O_2$ and remove same from the collected gas. The remaining gases are continuously oxidized in the higher positioned collection chamber 90.

The invention is not limited to the embodiments described above but all changes and modifications thereof not constituting departures from the spirit and scope of the invention are intended to be covered by the following claims.

What is claimed is:

1. An apparatus for combined thermal and radiation treatment of liquid bitumens containing reactor poisons comprising a power reactor adapted to be lowered into a boring in a bituminous stratum in combination with a radiation reactor, said power reactor having a reactor chamber surrounded by a reflector and carrying above it heat exchanger means, said heat exchanger means having an output side and an input side, a moderator in said reactor chamber for circulating through said input side, said radiation reactor having chamber means adjacent said heat exchanger means, said chamber means adapted to contain radioactive substances, means for conducting said liquid bitumens through said output side and said radiation reactor and means for discharging said liquid bitumens into underground deposits after having passed through said output side and said radiation reactor.

2. An apparatus for combined thermal and radiation treatment of liquid bitumens comprising a power reactor adapted to be lowered into a boring in a bituminous stratum in combination with a radiation reactor, said power reactor having a reactor chamber surrounded by a reflector and carrying above it heat exchanger means, said heat exchanger means having an output side and an input side, a moderator in said reactor chamber for circulating through said input side, said radiation reactor having chamber means adjacent said heat exchanger means, at the head and foot of said reactor chamber and inside said reflector, means for conducting said moderator through said input side, means for conducting said liquid bitumens through said output side and said radiation reactor, and means for discharging said liquid bitumens into underground deposits after having passed through said output side and said radiation reactor.

3. An apparatus for combined thermal and radiation treatment of liquid bitumens containing reactor poisons comprising a power reactor adapted to be lowered into a boring in a bituminous stratum in combination with a radiation reactor, said power reactor having a reactor chamber surrounded by a reflector and carrying above it heat exchanger means, said heat exchanger means having an output side and an input side, a moderator in said reactor chamber for circulating through said input side, said radiation reactor having chamber means adjacent said heat exchanger means, said chamber adapted to contain radioactive substances, conduit means for conducting said moderator through said input side, said conduit means extending into the head of said reactor chamber defining a gas cushion space in the head of said reactor chamber whereby circulating fuel elements are received when said power reactor overheats, means for conducting said liquid bitumens through said output side and said radiation reactor and means for discharging said liquid bitumens into underground deposits after having passed through said output side and said radiation reactor.

4. An apparatus for combined thermal and radiation treatment of liquid bitumens containing reactor poisons comprising a power reactor adapted to be lowered into a boring in a bituminous stratum in combination with a radiation reactor, said power reactor having a reactor chamber surrounded by a reflector and carrying above it heat exchanger means, said heat exchanger means having an output side and an input side, a moderator in said reactor chamber for circulating through said input side, said reactor chamber having a collecting chamber of small diameter for receiving fissionable fuel elements whereby the fission rate of the fissionable material remaining in the reactor chamber is maintained when the velocity of flow of the cooling medium diminishes, said radiation reactor having chamber means adjacent said heat exchanger means, said chamber means adapted to contain radioactive substances, means for conducting said moderator through said input side, means for conducting said liquid bitumens through said output side and said radiation reactor and means for discharging said liquid bitumens into underground deposits after having passed through said output side and said radiation reactor.

5. An apparatus for combined thermal and radiation treamtent of liquid bitumens comprising a power reactor adapted to be lowered into a boring in a bituminous stratum in combination with a radiation reactor, said power reactor having a reactor chamber surrounded by a reflector and carrying above it heat exchanger means, said heat exchanger means having an output side and an input side, a moderator in said reactor chamber for circulating through said input side, said reactor chamber having a collecting chamber of small diameter for receiving fissionable fuel elements whereby the fission rate of the fissionable material remaining in the reactor chamber is maintained when the velocity of flow of the cooling medium diminishes, said radiation reactor having chamber means adjacent said heat exchanger means, at the head and foot of said reactor chamber and inside said reflector, means for conducting said moderator through said input side, means for conducting said liquid bitumens through said output side and said radiation reactor, and means for discharging said liquid bitumens into underground deposits after having passed through said output side and said radiation reactor.

6. An apparatus for combined thermal and radiation treatment of liquid bitumens containing reactor poisons comprising a power reactor adapted to be lowered into a boring in a bituminous stratum in combination with a radiation reactor, said power reactor having a reactor chamber with fissionable elements firmly secured therein, said reactor chamber surrounded by a reflector and carrying above it heat exchanger means, said heat exchanger means having an output side and an input side, a moderator in said reactor chamber having finely divided granules of fissionable material dispersed therein for circulating through said input side, said radiation reactor having chamber means adjacent said heat exchanger means, said chamber means adapted to contain radioactive substances, means for conducting said moderator and said finely divided granules through said input side whereby said finely divided granules are activated by said fissionable elements and serve as a source of radiation in said heat exchanger and are returned to the reactor chamber to be reactivated, means for conducting said liquid bitumens through said output side and said radiation reactor and means for discharging said liquid bitumens into underground deposits after having passed through said output side and said radiation reactor.

7. An apparatus for combined thermal and radiation treatment of liquid bitumens comprising a power reactor adapted to be lowered into a boring in a bituminous stratum in combination with a radiation reactor, said power reactor having a reactor chamber with fissionable elements firmly secured therein, said reactor chamber surrounded by a reflector and carrying above it heat exchanger means, said heat exchanger means having an output side and an input side, a moderator in said reactor chamber having finely divided granules of fissionable material dispersed therein for circulating through said input side, said radiation reactor having chamber means adjacent said heat exchanger means, at the head and foot of said reactor chamber and inside said reflector, means for conducting said moderator and said finely divided granules through said input side whereby said finely divided granules are activated by said fissionable elements and serve as a source of radiation in said heat exchanger and are returned to the reactor chamber to be reactivated, means for conducting said liquid bitumens through said output side and said radiation reactor, and means for discharging said liquid bitumens into underground deposits after having passed through said output side and said radiation reactor.

8. An apparatus for combined thermal and radiation treatment of liquid bitumens comprising a power reactor adapted to be lowered into a boring in a bituminous stratum in combination with a radiation reactor, said power reactor having a reactor chamber with expandable corrugated walls whereby the reactor chamber with the inside pressure equal to the outside pressure may be lowered into and positioned in the boring while in non-critical condition whereupon the internal pressure is increased to increase the diameter and bring the reactor into critical condition, said reactor chamber carrying above it heat exchanger means, said heat exchanger means having an output side and an input side, a moderator in said reactor chamber for circulating through said input side, said radiation reactor having chamber means adjacent said heat exchanger means, said chamber adapted to contain radioactive substances, means for conducting said moderator through said input side, means for conducting said liquid bitumens through said output side and said radiation reactor and means for discharging said liquid bitumens into underground deposits after having passed through said output side and said radiation reactor.

References Cited by the Examiner

UNITED STATES PATENTS

| | | | |
|---|---|---|---|
| 2,865,827 | 12/1958 | Dwyer | 176—65 X |
| 2,905,610 | 9/1959 | Wigner | 176—39 X |
| 2,976,422 | 3/1961 | Hill et al. | 176—39 X |
| 3,052,613 | 9/1962 | Wigner et al. | 176—46 X |
| 3,054,738 | 9/1962 | Hermans et al. | 176—65 X |
| 3,080,308 | 3/1963 | Dickenson | 176—65 X |
| 3,080,918 | 3/1963 | Natland | 166—11 |

FOREIGN PATENTS

| | | |
|---|---|---|
| 217,265 | 9/1958 | Australia. |
| 823,777 | 11/1959 | Great Britain. |

REUBEN EPSTEIN, *Primary Examiner.*

CARL D. QUARFORTH, *Examiner.*